(12) United States Patent
Jeong et al.

(10) Patent No.: US 10,974,710 B2
(45) Date of Patent: Apr. 13, 2021

(54) WATERTIGHT CHAMBER TYPE ELECTRIC VACUUM PUMP AND VACUUM BOOSTING BRAKE SYSTEM

(71) Applicants: Hyundai Motor Company, Seoul (KR); Kia Motors Corporation, Seoul (KR)

(72) Inventors: Jae-Won Jeong, Gyeonggi-do (KR); Byoung-Soo Yoo, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/691,122

(22) Filed: Nov. 21, 2019

(65) Prior Publication Data

US 2020/0262406 A1 Aug. 20, 2020

(30) Foreign Application Priority Data

Feb. 15, 2019 (KR) .................. 10-2019-0017959

(51) Int. Cl.
*B60T 17/02* (2006.01)
(52) U.S. Cl.
CPC .................. *B60T 17/02* (2013.01)

(58) Field of Classification Search
CPC ........................................... B60T 17/02
See application file for complete search history.

(56) References Cited

U.S. PATENT DOCUMENTS

| 5,961,189 A * | 10/1999 | Lutteke | B60T 17/02 |
| | | | 303/114.3 |
| 6,324,845 B1 * | 12/2001 | Fulks | B60T 13/52 |
| | | | 60/397 |
| 2014/0119962 A1 * | 5/2014 | Sugimoto | F04C 18/344 |
| | | | 417/410.3 |
| 2019/0309745 A1 * | 10/2019 | Adler | B60T 17/002 |

FOREIGN PATENT DOCUMENTS

KR 10-2016-0082605 A 7/2016

\* cited by examiner

*Primary Examiner* — F Daniel Lopez
(74) *Attorney, Agent, or Firm* — Mintz Levin Cohn Ferris Glovsky and Popeo, P.C.; Peter F. Corless

(57) ABSTRACT

An electric vacuum pump applied to a vacuum boosting brake system is provided. The pump has a water containing capacity that is greater than a backflow water capacity of an internal space defined in a pump housing which forms vacuum pressure. The pump includes a watertight chamber that is coupled to an exhaust port of a pump housing.

15 Claims, 5 Drawing Sheets ically operated. Moreover,
WATERTIGHT CHAMBER TYPE ELECTRIC VACUUM PUMP AND VACUUM BOOSTING BRAKE SYSTEM

CROSS-REFERENCE TO RELATED APPLICATION

This application claims priority to Korean Patent Application No. 10-2019-0017959, filed on Feb. 15, 2019, which is incorporated herein by reference in its entirety.

BACKGROUND

Field of the Invention

The present invention relates to an electric vacuum pump, and, more particularly, to a vacuum boosting brake system that uses a watertight chamber type electric vacuum pump omitting a separate watertight retaining device even in an engine mounting structure having an insufficient watertight position.

Description of Related Art

Generally, an electric vacuum pump (EVP) is operated by an electric motor to generate vacuum pressure, and is used together with a vacuum boosting brake system of a turbo vehicle or a vehicle having insufficient brake negative pressure. Particularly, in the operation of a vacuum boosting type brake applied to vehicles, when vacuum pressure for brake boosting is insufficient, the force with which a driver engages a pedal is insufficient to generate sufficient braking force, and thus, vacuum pressure generated from an engine is used, and also insufficient vacuum pressure is required to be supplemented by the operation of the EVP using electricity.

Particularly, compared to a mechanical vacuum pump which is directly installed in a main body of an engine and engages with an engine shaft to operate together with the engine whereby fuel efficiency reduces due to an increase in engine drag, the EVP is advantageous in that the fuel efficiency is enhanced. Therefore, the EVP is mainly used to secure braking force of the vacuum boosting type brake when braking.

However, the EVP is sensitive to watertightness due to characteristics of being electrically operated. Moreover, since the EVP is installed around the engine, a failure in watertightness leads to damage to a vane. In addition, since the EVP is connected, along with an electric wiring line, to a communication line of a controller area network (CAN) for a chassis, a failure occurring in the EVP induces a failure in the entirety of a chassis controller.

Particularly, in the EVP, after a motor rotation interruption signal of the EVP controller is generated, a predetermined amount of water is reabsorbed by suction of the atmospheric air through an outlet by inertia rotation and reverse rotation of the motor, whereby an EVP outlet immersion event in which the motor is immersed in water occurs. Accordingly, in the EVP, the vane made of carbon material is damaged by reabsorbed water, and thus, the controller short-circuits due to contact with water, whereby a chassis CAN failure occurs and thus the entirety of the chassis controller coupled to the chassis CAN may malfunction.

Therefore, the EVP is designed with a snorkeling hose apparatus mounted to an air outlet portion to increase the height of the air outlet to a position at which it is not immersed in water, thus overcoming disadvantages in installation position. However, the application of this scheme causes structural problems and also an increase in the production cost.

SUMMARY

The present invention is directed to an electric vacuum pump and a vacuum boosting brake system which employs a watertight chamber. Therefore, even when the electric vacuum pump is installed at an insufficient watertight position, the watertightness is possible, and therefore, the production cost and the weight may be reduced by removing a typical snorkeling hose apparatus. Particularly, even when water is reversely suctioned by inertia rotation and reverse rotation of a motor after a motor rotation interruption signal is generated, water penetration may be prevented and blocked by the air pressure and volume of the watertight chamber, whereby even when the electric vacuum pump is immersed in water, an internal electric circuit may be prevented from being damaged.

Other objects and advantages of the present invention may be understood by the following description, and become apparent with reference to the exemplary embodiments of the present invention. Also, it is obvious to those skilled in the art to which the present invention pertains that the objects and advantages of the present invention can be realized by the means as claimed and combinations thereof.

In accordance with an exemplary embodiment of the present invention, an electric vacuum pump may include a watertight chamber coupled to an exhaust port of a pump housing that forms a vacuum pressure. In addition, the watertight chamber may have an open structure to allow water to be drawn thereinto. The watertight chamber may have a water containing capacity greater than a backflow water capacity of an internal space defined in the pump housing. Additionally, the watertight chamber may have an arc-shaped side surface to allow the watertight chamber to be proximate to a cylindrical body of the pump housing.

In an exemplary embodiment, the watertight chamber may include a chamber body having water containing capacity, and a connection port disposed on the chamber body and coupled with the exhaust port to integrate the watertight chamber with the pump housing. The connection port may include a chamber port that protrudes from the chamber body, and an extension hose that extends from the chamber port or is fitted into the exhaust port. The pump housing may include a port flange into which the exhaust port is penetrated, and an intake port penetrated into the port flange and configured to suction air to form a degree of vacuum at a position different from a position of the exhaust port.

In addition, a pump cap may be coupled to the port flange, and a vane may be disposed in an internal space of the pump cap to rotate the vane by a motor to form the degree of vacuum. The motor may be disposed under the port flange and coupled with the vane by a motor shaft. The motor may be coupled with a pump controller, and the pump controller may be disposed under the motor to drive the motor. In particular, the pump controller may be protected from the outside by a pump cover coupled to a lower side of the pump housing. The pump cover may include a connector port through which a power supply and a signal line may be coupled to the pump controller.

In accordance with an exemplary embodiment of the present invention, a vacuum boosting brake system may include: an electric vacuum pump including a watertight chamber having a water containing capacity greater than a backflow water capacity of in an internal space defined in a pump housing configured to form a vacuum pressure, the watertight chamber being coupled to an exhaust port of the pump housing; and a vacuum hose that couples a brake booster with the electric vacuum pump. The vacuum hose may be coupled to an intake port of the pump housing. The intake port may include a check valve configured to unidirectionally form a vacuum pressure in the vacuum hose.

As described above, an EVP applied to a vacuum boosting brake system in accordance with the present invention may include a watertight chamber and thus has the following operation and effects. First, even when the EVP is installed at an engine mounting position having insufficient watertightness, fluid may be prevented from being undesirably drawn into the EVP. Second, a motor failure due to insufficient watertightness of the EVP may be prevented, whereby the entirety of a chassis controller coupled to a chassis CAN may be prevented from malfunctioning.

Third, the snorkeling hose apparatus which has been used to prevent fluid from being drawn into the EVP may be omitted, and thus, the production cost may be reduced. Fourth, space may be secured by removing the snorkeling hose apparatus, whereby there are advantages in terms of a layout of an engine room. Fifth, the watertight chamber has a volume greater than the amount of water drawn by reverse rotation of the motor which occurs while the motor stops, whereby regardless of a vehicle model and specifications of a brake, the interior of the motor may be prevented from being immersed in water due to reverse water suction of an outlet of the EVP. Lastly, the watertight chamber may be changed in shape to have an EVP-outlet integrated structure or a separate threaded coupling structure depending on a layout of the engine room.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in detail with reference to the attached drawings. These exemplary embodiments are only for illustrative purposes and may be modified in various forms by those with ordinary knowledge in this art. Hence, the present invention is not limited to theses exemplary embodiments.

Figure 1:
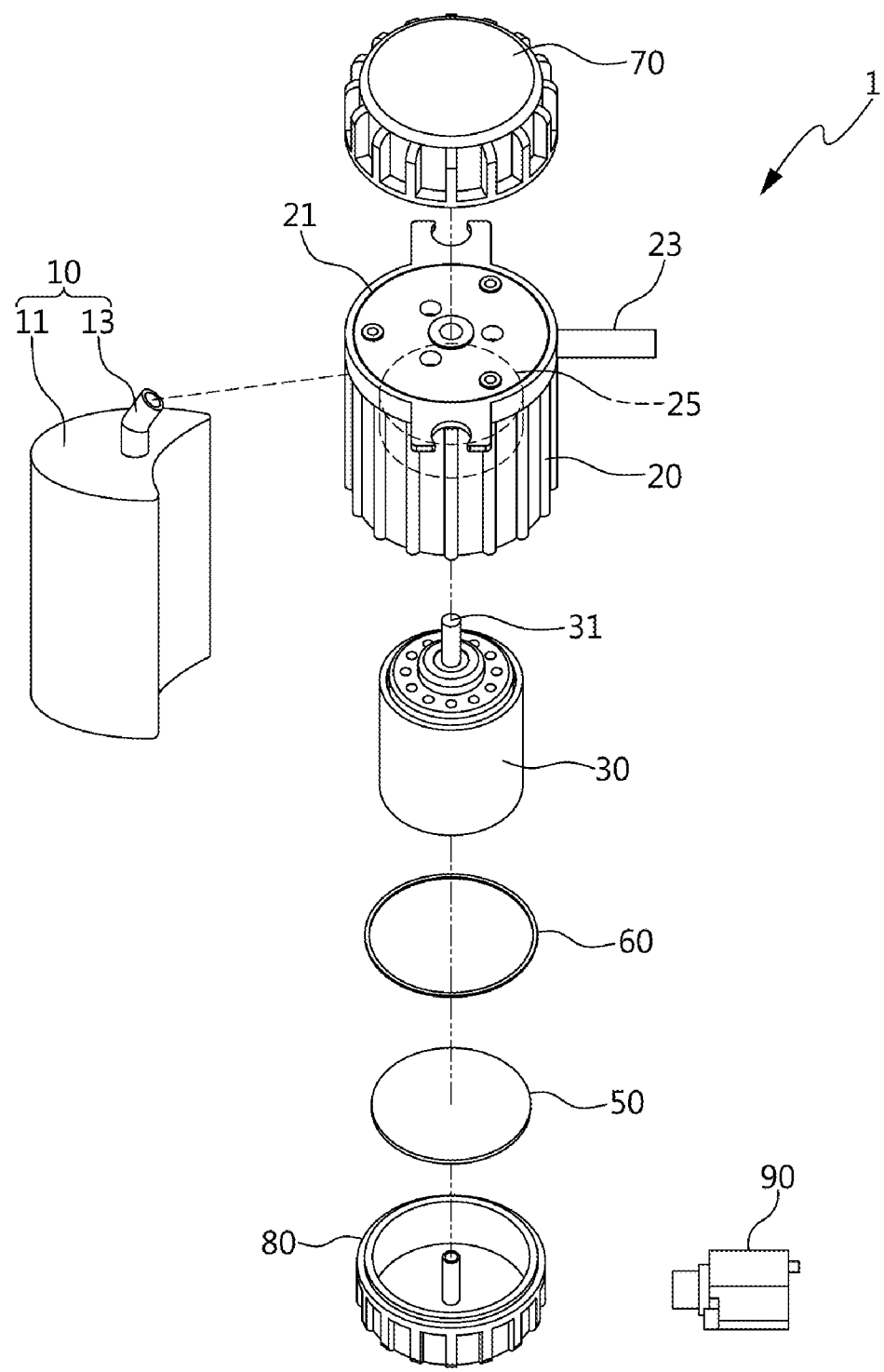
FIG. 1 is a diagram illustrating the configuration of a watertight chamber type electric vacuum pump in accordance with an exemplary embodiment of the present invention.

Referring to FIG. 1, an electric vacuum pump 1 may include a watertight chamber 10, a pump housing 20, a motor 30, a vane 40, a pump controller 50, a sealing ring 60, a pump cap 70, a pump cover 80, and a connector port 90. Therefore, the electric vacuum pump 1 is characterized as a watertight chamber type electric vacuum pump.

For example, the watertight chamber 10 may include a chamber body 11 and a connection port 13. The chamber body 11 may be formed as a hollow tank open on one side thereof to allow the tank to be filled with water. Particularly, a side surface of the chamber body 11 may have an arc shape to allow the chamber body 11 to abut an outer circumferential surface of a cylindrical housing body of the pump housing 20. The connection port 13 may be coupled to an exhaust port 25 of the pump housing 20 and thus may function as a passage through which water is discharged from the pump housing 20 into the watertight chamber 10 via the exhaust port 25.

Additionally, the pump housing 20 may be formed as the housing body having an internal space which houses the motor 30, the vane 40, and the pump controller 50. The pump housing 20 may be coupled to the exhaust port 25 with the arc-shaped chamber body of the watertight chamber 10 abutting the outer circumferential surface of the housing body. Accordingly, a port flange 21 may be provided on the pump housing 20. An intake port 23 and the exhaust port 25 may be provided on the port flange 21. The intake port 23 may protrude from a side surface of the port flange 21 and penetrate the port flange 21.

The exhaust port 25 may penetrate the port flange 21 such that the exhaust port 25 is inclined at a predetermined inclination angle in the port flange 21. Hence, the exhaust port 25 may be configured to discharge, to the outside, air drawn into the internal space of the pump housing 20 through the intake port 23. In addition, the exhaust port 25 may function as a passage through which stagnant water or moisture in the electric vacuum pump 1 may be discharged to the connection port 13 of the watertight chamber 10.

For example, the motor 30 may be a direct current (DC) type electric motor which is operated by the pump controller 50. A motor shaft 31 of the motor 30 may be coupled with the vane 40. Particularly, the motor shaft 31 may form an airtight structure on a junction with the vane 40. The pump controller 50 may include a printed circuit board (PCB) with electric and control devices, and may be disposed under the motor 30 and electrically coupled with the motor 30 to adjust the rotation of the motor 30. The sealing ring 60 may seal the motor 30 and the pump controller 50, thus protecting an electric circuit of the pump controller 50 from water.

For example, the pump cap 70 may be coupled to an upper side of the pump housing 20 using the port flange 21 provided on the housing body of the pump housing 20 to house or accommodate the vane 40 disposed over the pump housing 20 and protect the vane 40 from the outside. Particularly, the pump cap 70 may form a seal with the port flange 21 of the pump housing 20. The pump cover 80 may be coupled to a lower side of the pump housing 20 using the housing body of the pump housing 20, thus protecting a lower portion of the pump housing 20 from the outside. The connector port 90 may couple an external port supply, a signal line, etc. to the pump controller 50.

Figure 2:
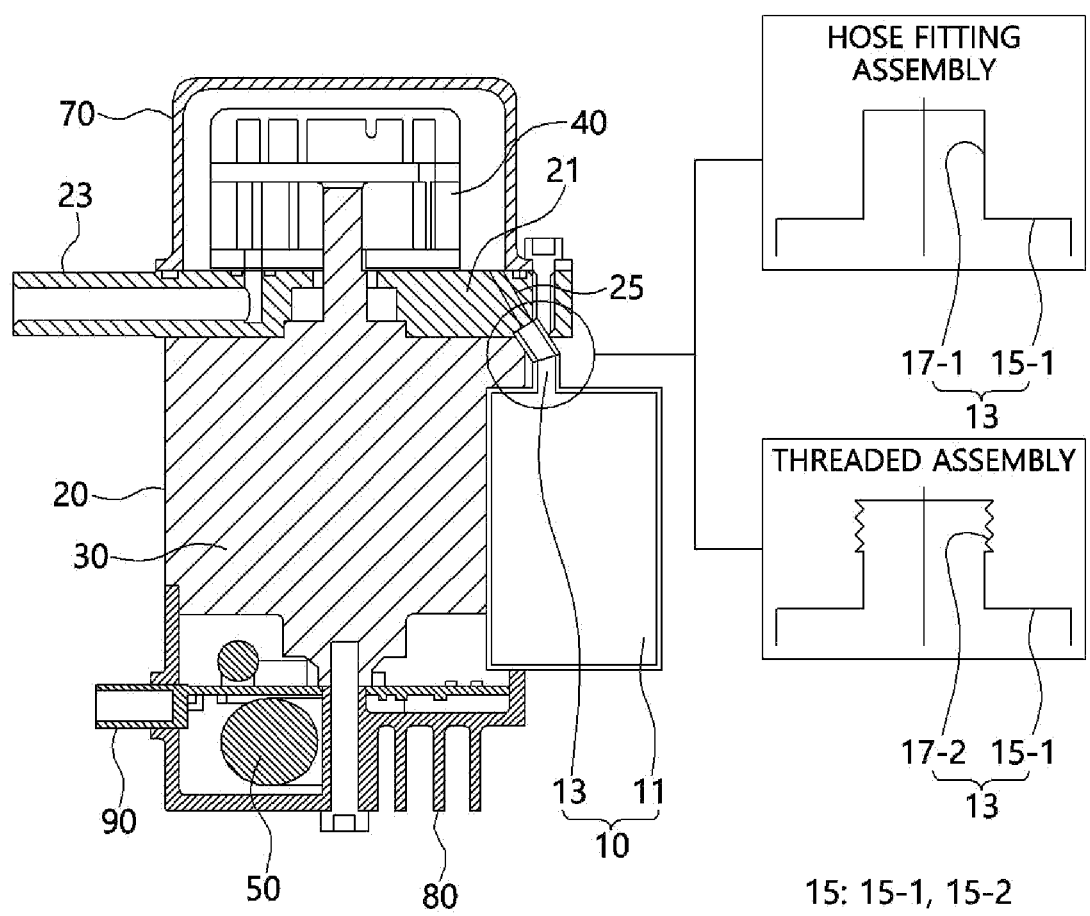
FIG. 2 is an assembly diagram of the electric vacuum pump to which a watertight chamber is applied through a hose fitting assembly or threaded assembly process, in accordance with an exemplary embodiment of the present invention.

Referring to FIG. 2, the connection port 13 of the watertight chamber 10 may have a bent structure. Particularly, an inclination angle of the bent structure may be the same as the inclination angle of the discharge port 25 of the pump housing 20. For example, the connection port 13 may include a chamber port 15-1, and an extension hose 17-1 having a bent structure relative to the chamber port 15-1 to have an inclination angle about that same as that of the exhaust port 25. In this case, the extension hose 17-1 may be fitted into the exhaust port 25 of the pump housing 20 using a planar outer circumferential surface of the extension hose 17-1. Alternatively, the exhaust port 25 of the pump housing 20 may be fitted into the extension hose 17-1. Accordingly, the exhaust port 25 may have an extension hose fitting depression into which the extension hose 17-1 may be inserted, or may have a protruding boss fitted into the extension hose 17-1.

In another example, the connection port 13 may include a chamber port 15-1, and a threaded extension hose 17-2 having a bent structure relative to the chamber port 15-1 to have an inclination angle about the same as that of the exhaust port 25. The threaded extension hose 17-2 may be threadedly coupled to the exhaust port 25 of the pump housing 20 using a threaded coupling structure. Accordingly, the exhaust port 25 may further include a thread tap having an internal thread that corresponds to an external thread of the threaded extension hole 17-1.

Referring again to FIG. 2, the port flange 21 of the pump housing 20 separates the motor 30 from the vane 40, and draws air into (e.g., suctions) the space in the pump cap 70 through the intake port 23 and then discharges the air into the watertight chamber 10 through the exhaust port 25.

Figure 3:
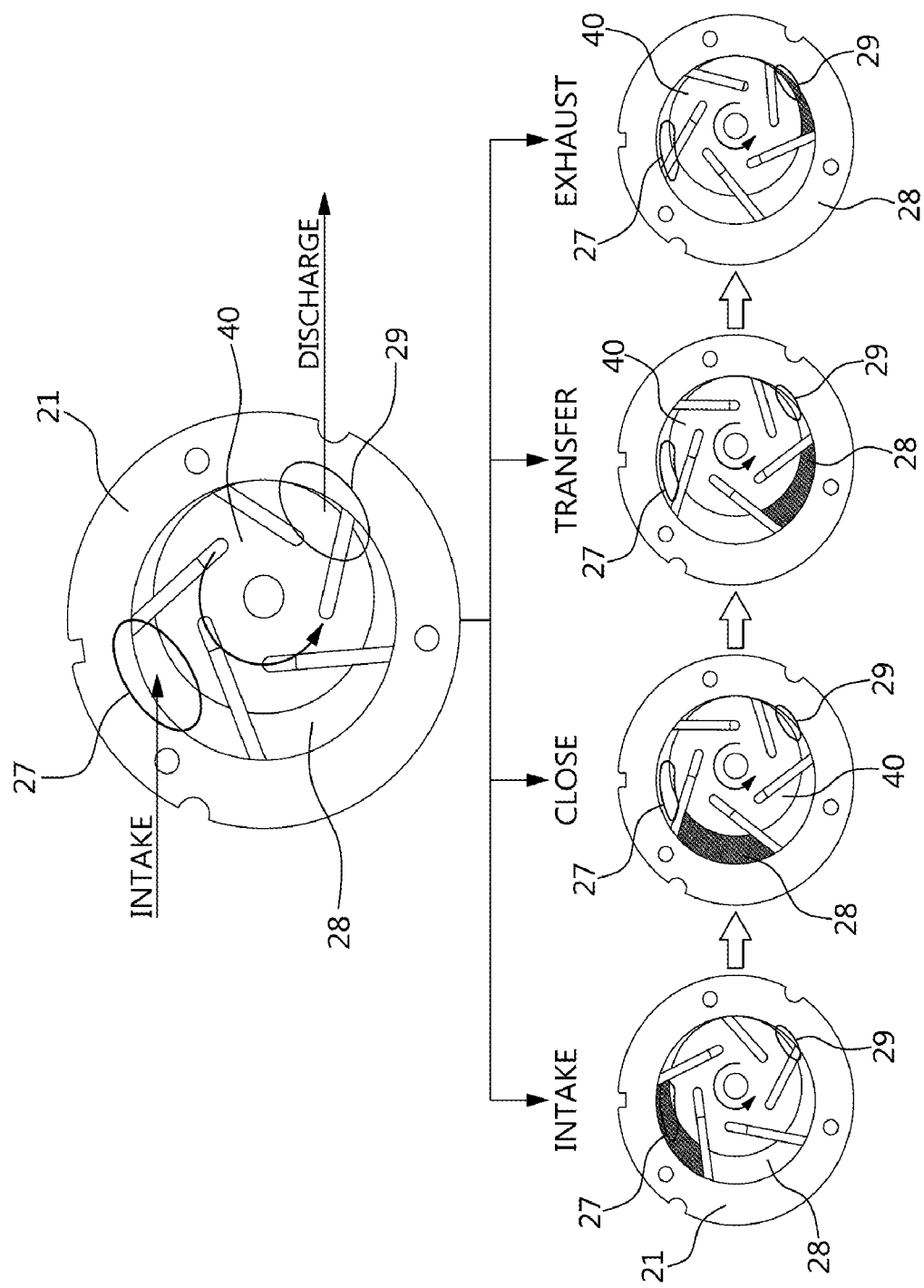
FIG. 3 is a diagram illustrating the operation of the watertight chamber type electric vacuum pump in accordance with an exemplary embodiment of the present invention.

FIG. 3 illustrates an operation of generating vacuum suction force by the vane 40 of the electric vacuum pump 1. As illustrated in the drawing, the vane 40 may be rotated by the motor shaft 31 of the motor 30 and may be configured to suction air through an intake path 27 in communication with the intake port 23, and then discharge, using the internal space of the pump cap 70 as a discharge path 28, the air into the watertight chamber 10 through an exhaust path 29 in communication with the exhaust port 25.

Therefore, the rotation of the vane 40 may perform an air intake operation through the intake path 27, a closing operation of the intake path 27, a transfer operation through the discharge path 28, and an exhaust operation through the exhaust path 29, thus forming vacuum pressure relative to an apparatus (e.g., a brake booster 120 of FIG. 5) coupled thereto.

Figure 4:
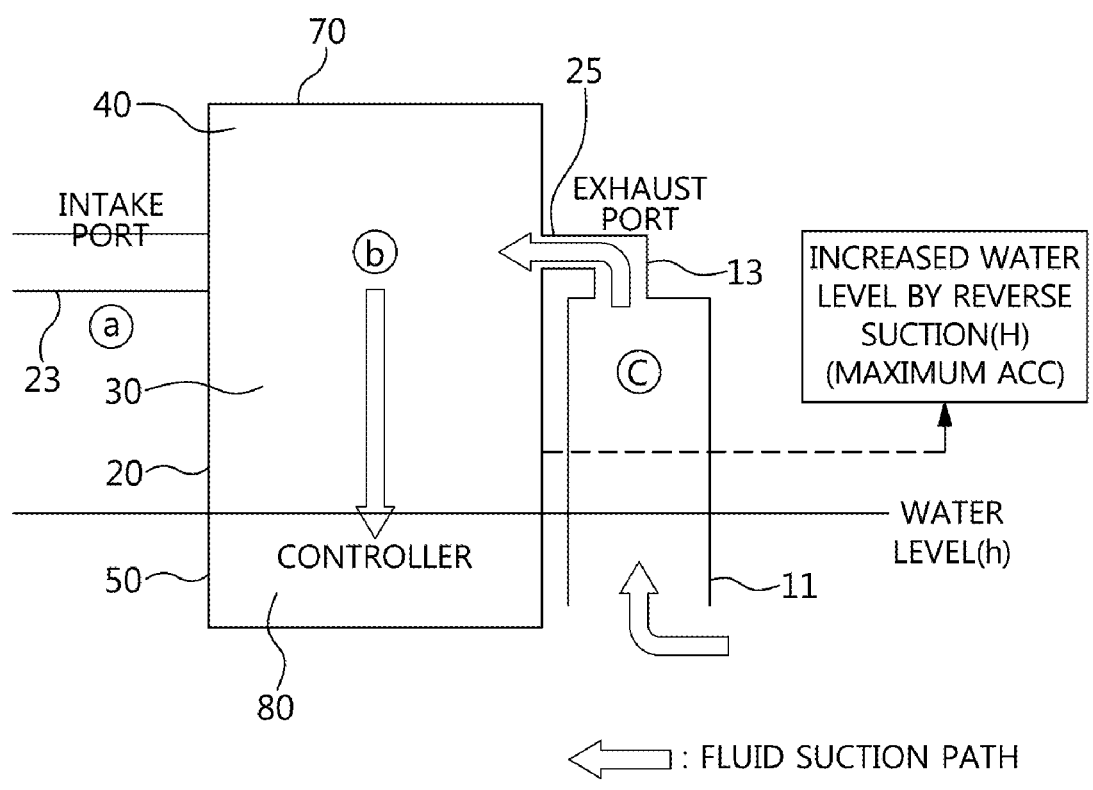
FIG. 4 is a diagram illustrating a fluid permeation blocking state of the watertight chamber when a motor of the watertight chamber type electric vacuum pump is reversely rotated, in accordance with an exemplary embodiment of the present invention.

FIG. 4 illustrates design conditions for the watertight chamber 10. As illustrated in the drawing, three types of pressures ⓐ, ⓑ, and ⓒ separated from each other may be generated in the electric vacuum pump 1. The pressure ⓐ may be generated during a period in which the operation of the motor 30 stops, and may be formed to a required value or more. The pressure ⓑ may be generated in the electric vacuum pump 1 and formed to a predetermined value. The pressure ⓒ may be atmospheric pressure formed in the internal space of the watertight chamber 10. For example, the pressures ⓐ and ⓑ is about 500-700 mmHg respectively, the pressures ⓒ is about 760 mmHg.

Therefore, the intensities of vacuum by the pressures ⓐ, ⓑ, and ⓒ are as follows. Relationship in the intensities of vacuum: pressure ⓐ>pressure ⓑ>pressure ⓒ. Here, ">" is an inequality sign indicating a relationship between two values. Accordingly, the pressure ⓐ is greater than the pressure ⓑ, and the pressure ⓑ is greater than the pressure ⓒ. Hence, during the period in which the operation of the motor 30 stops, water drawn from the watertight chamber 10 may flow backward into the exhaust port 25 via the connection port 13 and thus may be drawn into the vane 40, the motor 30, and the pump controller 50.

However, the capacity of the watertight chamber 10 is greater than the maximum amount of backflow water which flows backward into the internal space of the electric vacuum pump 1 by reverse rotation of the motor 30 when the motor 30 stops while a check valve 140 (refer to FIG. 5) coupled to the intake port 23 of the electric vacuum pump 1 is closed. Particularly, the maximum amount of backflow water may be approximately 5 cc (ACC). Therefore, even when the electric vacuum pump 1 draws water thereinto due to the degree of vacuum generated by reverse rotation of the motor, the watertight chamber 10 may retain the drawn water in the chamber body of the watertight chamber 10 having a predetermined chamber capacity, whereby the water may be prevented from flowing backward into the exhaust port 25 via the connection port 13.

Figure 5:
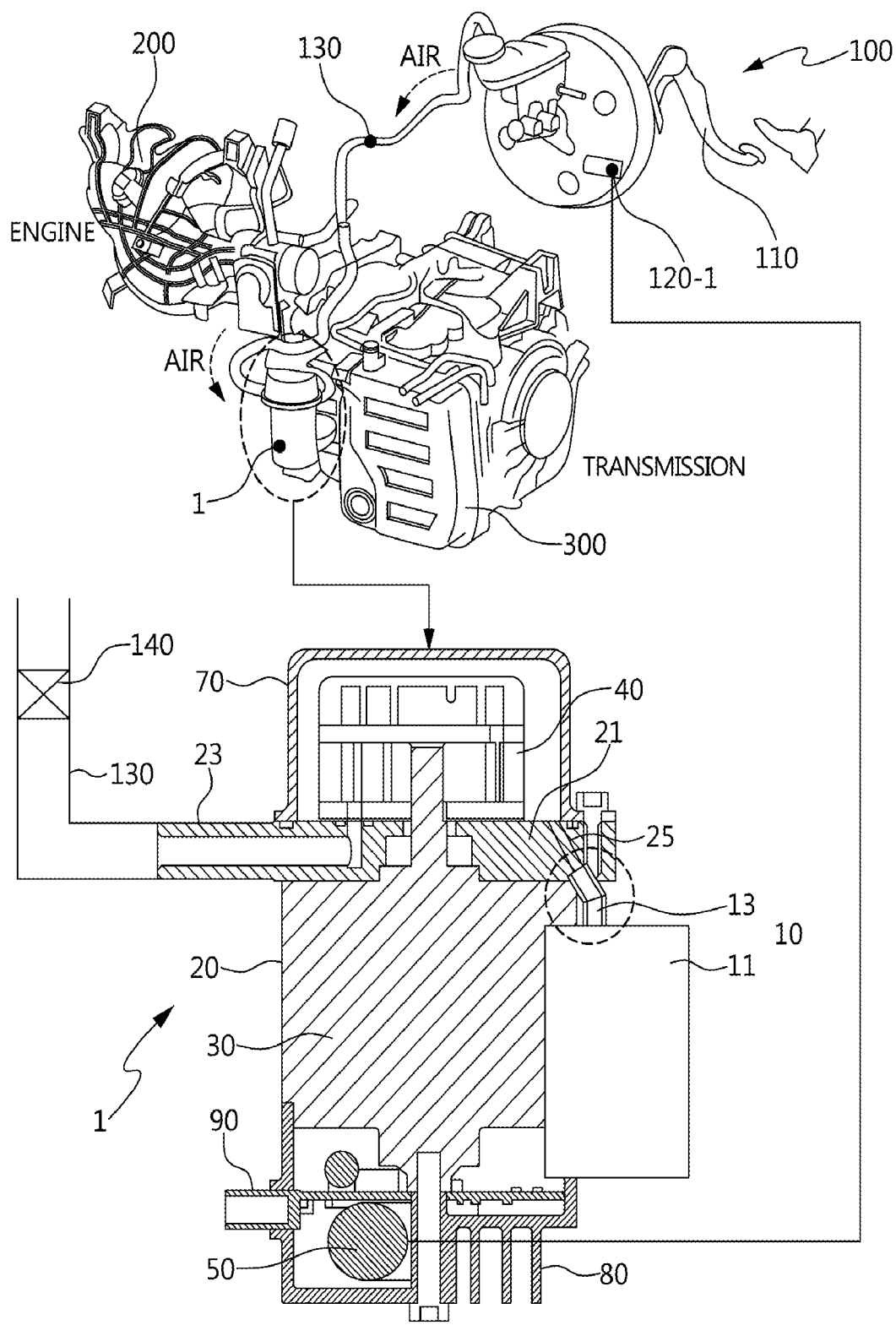
FIG. 5 is a diagram illustrating the configuration of a vacuum boosting brake system to which the watertight chamber type electric vacuum pump is applied, in accordance with an exemplary embodiment of the present invention.

Referring to FIG. 5, a vacuum boosting brake system 100 may include a watertight chamber type electric vacuum pump 1, and a brake vacuum pressure apparatus (110, 120, 120-1, 130, and 140). In particular, the watertight chamber type electric vacuum pump 1 may include a watertight chamber 10 and thus has the same structure of that of the watertight chamber type electric vacuum pump 10 described with reference to FIGS. 1 to 4. Therefore, the operation of the watertight chamber type electric vacuum pump 1 may form vacuum pressure for the brake booster 120 which is insufficient in vacuum pressure.

However, there is a difference in that the watertight chamber type electric vacuum pump 1 may include a check valve 140 to prevent the degree of vacuum of the watertight chamber type electric vacuum pump 1 from being transmitted to the brake booster 120 by coupling the vacuum hose 130 of the brake vacuum pressure apparatus of the pump housing 20. In an exemplary embodiment, the brake vacuum pressure apparatus (110, 120, 120-1, 130, and 140) may include a pedal 110, a brake booster 120, a negative pressure switch 120-1, a vacuum hose 130, and a check valve 140.

For example, the pedal 110 is a brake pedal and may be connected with the brake booster 120. The brake booster 120 may be configured to boost pedal pressing force using vacuum pressure generated in conjunction with an operation of pressing the pedal 110. The negative pressure switch 120-1 (e.g., sensor) may be configured to detect vacuum pressure of the brake booster 120 and transmit the vacuum pressure to the pump controller 50 to generate information for operating the motor 30. The vacuum hose 130 may couple the brake booster 120 with the intake port 23 of the watertight chamber type electric vacuum pump 1, thus functioning to supplement an insufficient degree of vacuum of the brake booster 120 using the operation of the motor 30. The check valve 140 may be applied to the intake port 23 of the pump housing 20, which forms the watertight chamber type electric vacuum pump 1, to form a unidirectional flow of vacuum pressure to thus prevent the degree of vacuum of the watertight chamber type electric vacuum pump 1 from being transmitted to the brake booster 120.

Therefore, the vacuum boosting brake system 100 may use all advantages of the watertight chamber type electric vacuum pump 1. For example, the advantages of the watertight chamber type electric vacuum pump 1 are as follows.

First, the watertight chamber 10 prevents water from permeating through the exhaust port 25 using the pressure of air which is present in the chamber body while the electric vacuum pump is immersed in water. Second, the chamber body has a capacity greater than about 5 cc (ACC) that is the maximum suction amount of water flowing backward due to reverse rotation of the motor 30 caused when the operation of the motor 30 stops. Therefore, immersion in water due to reverse water suction may be fundamentally prevented.

Third, compared to a typical snorkeling hose, the watertight chamber 10 provides advantages in terms of a layout, the material cost, and the weight. Fourth, the watertight chamber 10 may be modified into a separable watertight chamber 10 having a threaded structure using the threaded extension hose 17-2 of the connection port 13. Therefore, a change in shape of the watertight chamber 10 depending on the layout may be facilitated.

As described above, the electric vacuum pump 1 applied to the vacuum boosting brake system 100 in according to an exemplary embodiment of the present disclosure may have a water containing capacity greater than a backflow water capacity of the internal space defined in the pump housing 20 which forms vacuum pressured, and may include the watertight chamber 10 coupled to the exhaust port 25 of the pump housing 20.

Watertightness for the electric vacuum pump 1 which is installed at an insufficient watertight position may be secured, and thus, the typical snorkeling hose apparatus may be removed, whereby the production cost and weight of the electric vacuum pump 1 may be reduced. Particularly, the possibility of backflow water when the operation of the motor 30 stops may be prevented by the water chamber 10 having a sufficient water capacity. Therefore, the internal electric circuit may be prevented from being damaged even when the electric vacuum pump 1 is immersed in water.

While the present invention has been described with respect to the exemplary embodiments, it will be apparent to those skilled in the art that various changes and modifications may be made without departing from the spirit and scope of the invention as defined in the following claims.

What is claimed is:

1. An electric vacuum pump, comprising:
   a watertight chamber coupled to an exhaust port of a pump housing, the electric vacuum pump forming a vacuum pressure,
   wherein the watertight chamber has an arc-shaped side surface so that the watertight chamber abuts a cylindrical body of the pump housing.

2. The electric vacuum pump of claim 1, wherein the watertight chamber has a water containing capacity greater than a backflow water capacity of in an internal space defined in the pump housing.

3. The electric vacuum pump of claim 1, wherein the watertight chamber includes:
   a chamber body having the water containing capacity; and
   a connection port protrudes from the chamber body and an extension hose that extends from the connection port and connects to the exhaust port to integrate the watertight chamber with the pump housing.

4. The electric vacuum pump of claim 3, wherein the connection port has a bent structure corresponding to an inclination angle of the exhaust port.

5. The electric vacuum pump of claim 3, wherein the extension hose is fitted into the exhaust port.

6. The electric vacuum pump of claim 3, wherein the extension hose is threadedly coupled with the exhaust port.

7. The electric vacuum pump of claim 1, wherein the pump housing includes:
   a port flange into which the exhaust port is penetrated; and
   an intake port penetrated into the port flange and configured to suction air to form a degree of vacuum at a position different from a position of the exhaust port.

8. The electric vacuum pump of claim 7, wherein a pump cap is coupled to the port flange, and a vane is disposed in an internal space of the pump cap to rotate the vane by a motor to form the degree of vacuum.

9. The electric vacuum pump of claim 8, wherein the motor is disposed under the port flange and coupled with the vane by a motor shaft.

10. The electric vacuum pump of claim 9, wherein the motor is coupled with a pump controller, and the pump controller is disposed under the motor to drive the motor.

11. The electric vacuum pump of claim 10, wherein the pump controller is protected from an outside by a pump cover coupled to a lower side of the pump housing.

12. The electric vacuum pump of claim 11, wherein a connector port of the pump cover connects a power supply and a signal line to the pump controller.

13. A vacuum boosting brake system, comprising;
   the electric vacuum pump of claim 1; and
   a vacuum hose that couples a brake booster with the electric vacuum pump.

14. The vacuum boosting brake system of claim 13, wherein the vacuum hose is coupled to an intake port of the electric vacuum pump.

15. The vacuum boosting brake system of claim 14, wherein the intake port includes a check valve configured to unidirectionally form a vacuum pressure in the vacuum hose.

* * * * *